(12) United States Patent
Kikuchi et al.

(10) Patent No.: US 7,592,082 B2
(45) Date of Patent: Sep. 22, 2009

(54) FUEL CELL, ELECTRONIC APPARATUS AND CAMERA

(75) Inventors: Hiroshi Kikuchi, Zushi (JP); Yuki Totori, Tokyo (JP); Toshifumi Urakami, Yokohama (JP); Go Tokura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/331,581

(22) Filed: Dec. 10, 2008

(65) Prior Publication Data

US 2009/0086087 A1 Apr. 2, 2009

Related U.S. Application Data

(62) Division of application No. 11/079,987, filed on Mar. 15, 2005, now abandoned.

(30) Foreign Application Priority Data

| Mar. 15, 2004 | (JP) | ............................. 2004-073109 |
| Mar. 30, 2004 | (JP) | ............................. 2004-101096 |
| May 7, 2004 | (JP) | ............................. 2004-138085 |

(51) Int. Cl.
*H01M 2/02* (2006.01)
*G03B 17/02* (2006.01)

(52) U.S. Cl. ............................. 429/12; 429/34; 396/539

(58) Field of Classification Search ................. 396/535, 396/539, 540; 348/372; 429/12, 34
See application file for complete search history.

(56) References Cited

U.S. PATENT DOCUMENTS

| 6,224,995 | B1 | * | 5/2001 | Fauteux et al. ................. 429/48 |
| 6,233,402 | B1 | | 5/2001 | Solomon et al. |
| 6,824,905 | B2 | * | 11/2004 | Shioya et al. .................. 429/22 |
| 2004/0258976 | A1 | * | 12/2004 | Nishizawa .................... 429/34 |
| 2005/0008918 | A1 | * | 1/2005 | Nakakubo et al. ............. 429/34 |
| 2005/0014058 | A1 | | 1/2005 | Dave et al. |

FOREIGN PATENT DOCUMENTS

| JP | 63-205060 A | 8/1988 |
| JP | 2000-268835 A | 9/2000 |
| JP | 2003-295284 A | 10/2003 |
| JP | 2003-344919 A | 12/2003 |

* cited by examiner

*Primary Examiner*—Gregg Cantelmo
(74) *Attorney, Agent, or Firm*—Cowan, Liebowitz & Latman, P.C.

(57) ABSTRACT

A fuel cell is disclosed, which can use space in an apparatus body effectively. The fuel cell comprises a plurality of cells laminated, and a cell box housing the plurality of cells. The plurality of cells include a cell whose size in a first direction orthogonal to a lamination direction is different from that of another cell. The cell box has a shape corresponding to the size of each cell. Furthermore, an electronic apparatus is disclosed, which comprises an apparatus body including a grip portion having a protruding shape; and a fuel cell that is housed in the grip portion and comprises a cell section in which a plurality of cells are laminated in a protrusion direction of the grip portion or a direction orthogonal to the protrusion direction.

2 Claims, 15 Drawing Sheets

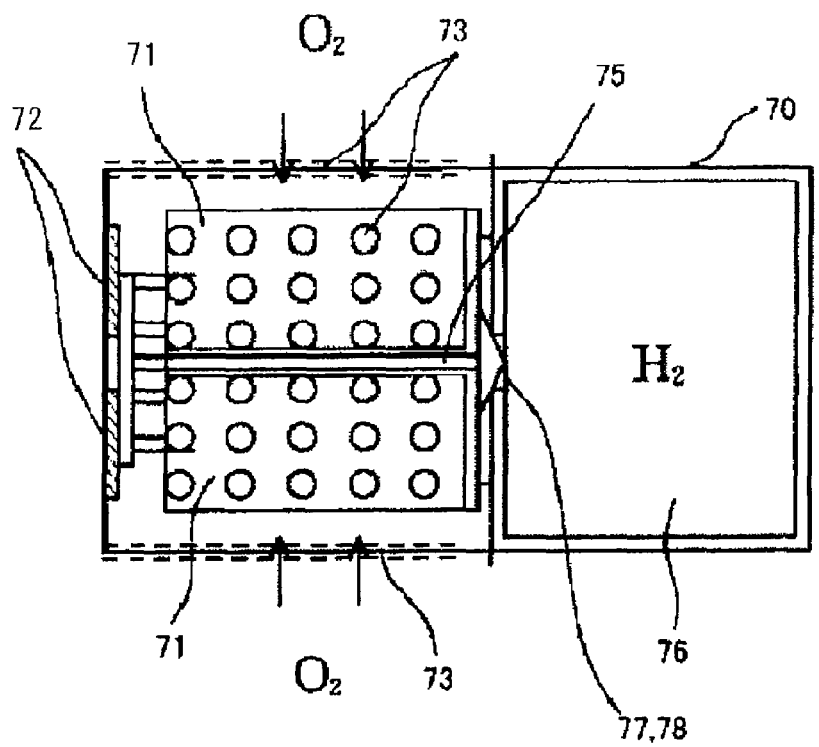
FIG. 7A *(PRIOR ART)*
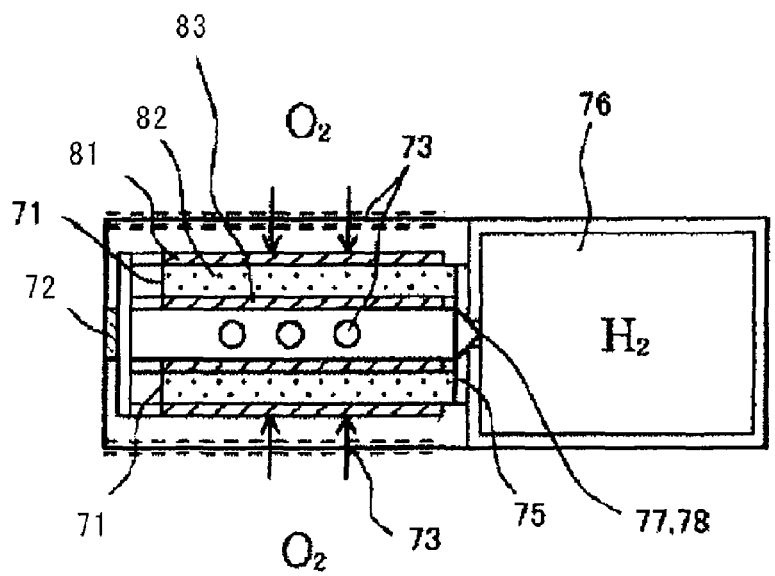
FIG. 7B *(PRIOR ART)*

FUEL CELL, ELECTRONIC APPARATUS AND CAMERA

CROSS-REFERENCE TO RELATED APPLICATIONS

This application is a divisional of application Ser. No. 11/079,987, filed Mar. 15, 2005, now abandoned, the entire disclosure of which is hereby incorporated by reference.

FIELD OF THE INVENTION

The present invention relates to fuel cells, which are used for electric apparatuses such as cameras and supply electric power thereto.

BACKGROUND OF THE INVENTION

Digital cameras are known, each of which electrically converts object images formed by an image-taking lens into image signals using a solid image-pickup device such as a CCD sensor, records A/D-converted image signals to recording medium, and displays images on a built-in liquid crystal monitor.

Especially, in a single-lens reflex digital camera including an interchangeable lens, it is required to have a good operationality, high-speed continuous shooting performance, high quality image taking ability and image taking ability for wide luminance range, similar to silver-halide film cameras. For these requirements, the digital camera comprises an image-pickup device having many pixels and a high sensitivity, and furthermore a larger-scale electronic circuit including many electronic devices such as an image-taking circuit, image-processing circuit and image-displaying circuit than that of the silver-halide film camera.

Therefore, the digital camera consumes a large amount of electric power, and thereby requiring a battery having a sufficient energy supplying ability.

However, it becomes difficult to supply sufficient energy to the camera for driving it by a conventional primary battery or rechargeable battery because of reduction in size and weight of the camera.

To solve the problem, small fuel cells are being watched. The fuel cell has higher power generation efficiency than a conventional power generation system, and produces clean wastes. Furthermore, an energy supplying ability of the fuel cell is several or dozens of times that of the conventional batteries. Therefore, the fuel cell is useful as a power source for a small electronic apparatus (see Japanese Laid-Open Patent Applications 2003-344919, 2003-295284 and 2000-268835, for example).

The fuel cell comprises a cell section in which a plurality of cells are laminated, a fuel tank section which reserves fuel that will be fed to the cell section, a fuel feed section which feeds the fuel in the fuel tank section to the cell section, a fuel feed path through which a hydrogen storing material is fed to the cell section, and a distributing section which gathers generated electric power to store it temporarily and outputs it usually stably.

On the other hand, a grip portion is provided in the camera, which protrudes in a camera thickness direction and has a substantially circular arc shape to make it easy to grip the camera. The shape of the grip portion is suitable for housing conventional cylindrical batteries. Arranging the heavy batteries in the grip portion makes the weight balance of the camera gripped by a user good.

However, the cell section of the conventional fuel cell has a structure in which a plurality of cells having the same size are laminated, and the exterior shape thereof is generally rectangular parallelepiped. Therefore, a comparatively large space leaves in the grip portion by arranging such a cell section therein. In other words, the space in which the fuel cell is arranged cannot be used effectively.

In addition, even a fuel cell which is small and has a large energy supplying ability requires increasing the entire output by laminating the cells as many as possible to increasing an output voltage, or by increasing the area of each cell to increase an output current, in a case where the fuel cell is used for an electronic apparatus requiring a large amount of power.

Furthermore, in a camera using a fuel cell as a power source battery, to make the camera easy to use for a user, it is required to optimize the arrangement of members that constitutes the fuel cell so that growing in size of the camera can be suppressed and a large-capacity fuel cell can be used.

SUMMARY OF THE INVENTION

An object of the present invention is to provide a fuel cell that can use space in the apparatus body effectively and supply a large amount of energy by increasing the lamination number or area of cells, a electronic apparatus and camera with the same.

A fuel cell as one aspect of the present invention comprises a plurality of cells that are laminated, and a cell box that houses the plurality of cells. The plurality of cells include a cell whose size in a first direction orthogonal to a lamination direction of the cells is different from that of another cell, and the cell box has a shape corresponding to the size of each cell.

An electronic apparatus as another aspect of the present invention comprises the above-mentioned fuel cell, and an apparatus body housing the fuel cell. At least a part of the cell box has a shape that follows the shape of the apparatus body.

An electronic apparatus as another aspect of the present invention comprises an apparatus body that includes a grip portion having a protruding shape, and a fuel cell that is housed in the grip portion and comprises a cell section in which a plurality of cells are laminated in a first direction. The first direction is a protrusion direction of the grip portion or a direction orthogonal to the protrusion direction.

A camera as another aspect of the present invention comprises an apparatus body that is constituted by a first body and a second body, the first body holding an image-pickup device, and the second body constituting a grip portion that has a shape protruding with respect to the first body, and a fuel cell that comprises a cell section and a fuel tank reserving fuel that is fed to the cell section. The cell section is arranged in the second body, and the fuel tank is arranged in the first and second bodies.

A camera as still another aspect of the present invention comprises a camera body holding an image-pickup device, and a cell housing member that houses a fuel cell and is detachably attached to the camera body. The cell housing member constitutes a grip portion of the camera by being attached to the camera.

Other objects and further features of the present invention will become readily apparent from the following description of the preferred embodiments with reference to accompanying drawings.

BRIEF DESCRIPTION OF THE DRAWINGS

FIGS. 7A and 7B are sectional views showing the structure of a conventional fuel cell.

DETAILED DESCRIPTION OF THE PREFERRED EMBODIMENTS

A description will now be given of the preferred embodiments of the present invention by referring to the accompanying drawings.

Embodiment 1

Figure 1:
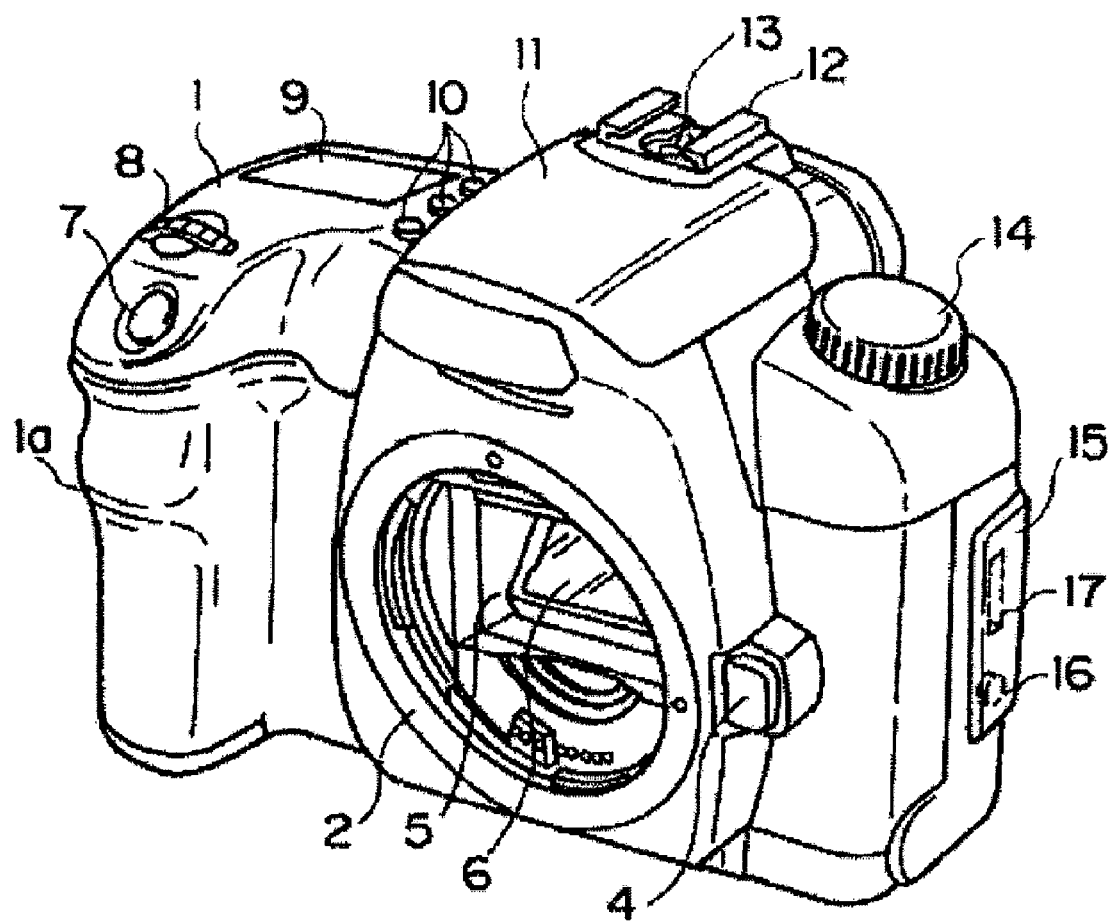
FIG. 1 is a front perspective view of cameras of Embodiments 1 to 3 of the present invention.
Figure 2:
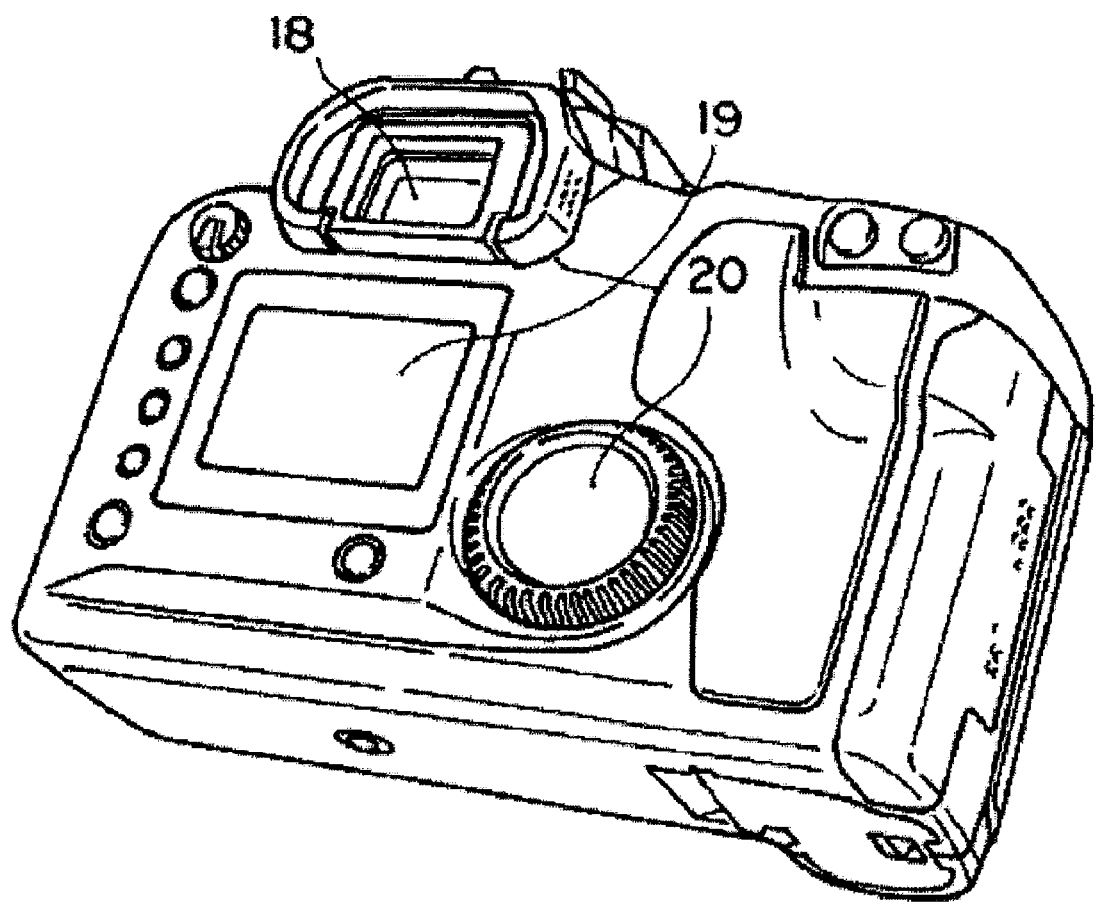
FIG. 2 is a rear perspective view of the cameras of Embodiments 1 to 3.
Figure 3:
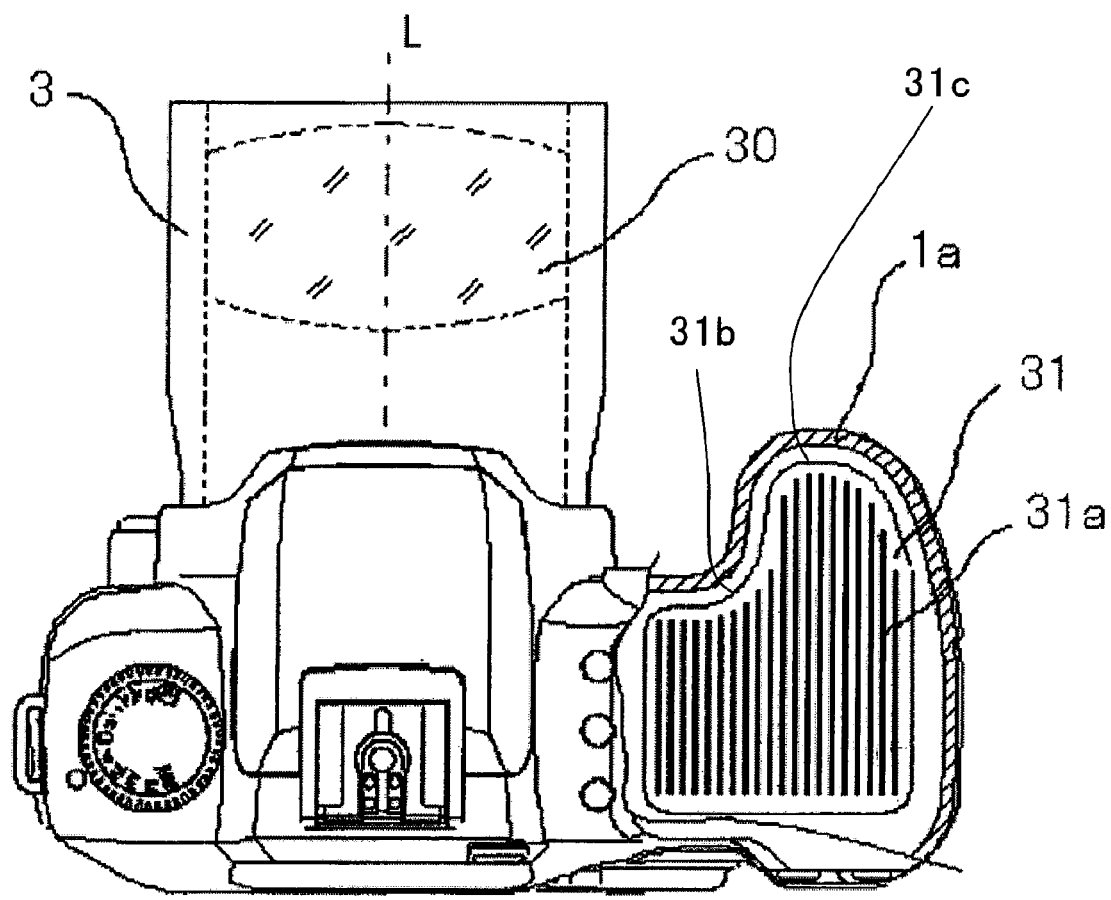
FIG. 3 is a sectional top view of a part of the camera of Embodiment 1.

FIG. 1 is a front perspective view of a camera (electronic apparatus) of Embodiment 1 of the present invention. FIG. 2 is a rear perspective view of the camera of Embodiment 1. FIG. 3 is an observation view of the camera of Embodiment 1. In FIG. 3, a part of the exterior of the camera is omitted so that the fuel cell can be seen to understand the arrangement of a fuel cell easily.

Each of FIG. 1 and FIG. 2 shows a state in which the camera without a lens apparatus, and FIG. 3 shows the camera with the lens apparatus attached on a mount portion 2 of the camera.

First, the outline of the camera will be explained using FIG. 1 and FIG. 2. The reference numeral 1 denotes an exterior member forming the exterior of the camera, the exterior member constituting a camera body. In the left area of the exterior member 1 when viewed from the front, a grip portion 1a protruding forward is provided. A user can hold the camera stably by gripping the grip portion 1a at the time of image-taking. The reference numeral 2 denotes a mount portion formed on the front side of the camera, a lens apparatus 3 (shown in FIG. 3) being mounted on the mount portion 2.

The reference numeral 4 denotes a lens-lock-releasing button. The lens apparatus 3 can be detached from the camera by pushing the lens-lock-releasing button 4. The reference numeral 5 denotes a mirror box holding a quick-return mirror 6, which is arranged in an image-taking optical path at the time of observation of an object and arranged out of the image-taking optical path at the time of image-taking. The quick-return mirror 6 is arranged in the image-taking optical path so as to form an angle of about 45 degrees with an optical axis to lead light from the lens apparatus 3 to a finder optical system, not shown in the figure.

A shutter button 7, a main operation dial 8, an LCD panel 9 and a top mode setting button 10 are provided in the left area of the top of the camera. The shutter button 7 is a button for indicating a start of image-taking operation to the camera. The main operation dial 8 is a dial for setting a shutter speed and lens aperture value in accordance with an operation mode at the time of image-taking. The LCD panel 9 displays the operation mode of the camera. The top mode setting button 10 is operated for selecting a continuous shooting mode and a single shooting mode, and setting a self-image-taking mode. The LCD panel 9 displays the setting situation by the top mode setting button 10.

A flash unit 11 popping up from the camera body, a shoe groove 12 for attaching an external flash apparatus (not shown in the figure) and a flash contact 13 are provided in the center area in the top face of the camera. An image-taking-mode-setting dial 14 is arranged in the right area of the top face of the camera.

An external contact cover 15 is provided in the right side face of the camera. The external contact cover 15 can be closed and opened. The external contact cover 15 is closed to cover a contact housing portion, in which a video signal output contact 16 and a USB output connector 17 as external interfaces are provided.

The upper area on the back face of the camera, a finder eyepiece window 18 is provided. Moreover, on the center of the back face of the camera, a color liquid crystal display portion 19, which displays taken images or the like is provided. A sub operation dial 20, which is arranged beside the color liquid crystal display portion 19, assists functions of the main operation dial 8; it is used for setting an exposure correction amount with respect to an optimal exposure value calculated by an auto exposure unit in an AE mode, for instance. In addition, the main operation dial 8 is used for setting a shutter speed and the sub operation dial 20 is used for setting a lens aperture value in a mode in which each of the shutter speed and the lens aperture value is determined according to a user's intention. The sub operation dial 20 is operated for selecting an image to be displayed by the color liquid crystal display portion 19.

Next, the fuel cell, which is the power source of the camera in the present embodiment, will be explained. First, the general structure of a conventional fuel cell will be explained using FIGS. 7A and 7B. FIG. 7A is a plain view of the general fuel cell, and FIG. 7B is a front view thereof.

The fuel cell has air holes 73 in the top, bottom and longitudinal side faces of a housing 70 for taking outside air in the housing 70. Oxygen included in the outside air is used as an oxidizer in reaction. Heat generated in the fuel cell and vapor of water generated by the reaction are exhausted through the air holes 73 outside the housing 70. Electrodes 72 for outputting electric power generated in the fuel cell are provided in one of side faces orthogonal to the longitudinal side face.

The housing 70 houses a plurality of cells 71, each being constituted by a fuel electrode 83, polyelectrolyte film 82, oxidizer electrode 81 and catalyst, not shown in the figure, a fuel tank 76 reserving fuel, fuel feed paths 75, each connecting the fuel tank 76 to the fuel electrode 83 of the cell 71, and a pressure sensor 77 measuring pressure of the fuel.

In FIG. 7, the fuel cell comprises two cells 71 that have the same area and are laminated. However, increasing the lamination number of the cells increases the output voltage.

Next, the explanation about the fuel tank 76 will be given. A hydrogen storing alloy which can store hydrogen is contained in the fuel tank 76. Since a withstand pressure of the polyelectrolyte film 82 that is used in the fuel cell is in a range of 0.3 to 0.5 MPa, the fuel tank 76 has to be used in a range in which the pressure difference from the outside air is equal to 0.1 MPa or less.

The hydrogen storing alloy that has a characteristic in which the releasing pressure of hydrogen is 0.2 MPa at a normal temperature includes $LaNi_5$. Since $LaNi_5$ can store hydrogen of 1.1 wt % per one weight, the amount of hydrogen stored in the fuel tank 76 is 0.4 g, and the amount of energy that can be generated is about 11 [Whr], it being about four times that of a lithium-ion battery.

In a case where a hydrogen storing alloy whose releasing pressure of hydrogen is more than 0.2 MPa at the normal temperature is used, it is needed to provide a pressure reducing valve 78 between the fuel tank 76 and the fuel electrode 72.

The hydrogen reserved in the tank 76 is fed to the fuel electrode 113 through the fuel feed paths 75. The outside air is fed to the oxidizer electrode 81 through the air holes 73. The electric power generated in the fuel cell is supplied to the camera from the electrode 72. A portion of each electrode, which contacts water for electrolyzation, in the fuel cell, is insulated so as not to short other electrodes. The insulation can be provided by covering a portion that does not contact the polyelectrolyte film of the electrode with an insulator.

As described above, the general fuel cell is constituted by laminating the plurality of cells 71 that have the same size. However, in a fuel cell of the present invention, the size of at least one cell of the plurality of cells that are laminated is different from that of another cell.

The fuel cell of the present embodiment will be explained using FIG. 3. FIG. 3 is a sectional view of the neighboring part of the grip portion 1a that is a part of the camera's exterior member 1 when viewed from the top of the camera.

In FIG. 3, the reference numeral 3 denotes a lens barrel holding an image-taking lens, the lens barrel 3 being detachably attached to the camera. In the right portion of the camera in the figure, the grip portion 1a for holding the camera is provided, the grip portion 1a being protruded forward from the camera. A cell box 31 that has a shape following the shape of the grip portion 1a is housed in the grip portion 1a. In the cell box 31, a plurality of cells 31a are laminated in the longitudinal direction of the camera.

The lengths of the cells 31a in a direction orthogonal to the lamination direction thereof are different from each other according to the shape of the cell box 31 because the cells 31a are formed so as to follow the shape of the cell box 31. In other words, the cell 31a arranged in the most protruding portion in the grip portion 1a has the maximum area, and the area of the cells 31a decreases continuously or stepwise from there toward the right and left.

In other words, the plurality of the cells 31a include a group of cells whose size in the direction orthogonal to the lamination direction change continuously or stepwise. The cell box 31 has a concave shape portion 31b and convex portion 31c corresponding to the size of the group of cells. These concave shape portion 31b and convex portion 31c are also curved shape portions corresponding to the size of the group of cells.

As described above, in the present embodiment, since the shape of the cell box 31 is set so as to follow the shape of the grip portion 1a, it is possible to decrease the space between the grip portion 1a and the cell box 31. As a result, the generation of wasted space in the camera 1 can be prevented.

Furthermore, since the length of each cell 31a in the direction orthogonal to the lamination direction is set in accordance with the shape of the grip portion 1a, it is possible to increase the lamination number of cells more than a conventional cuboid fuel cell. Thereby, it is possible to ensure a sufficient voltage that is necessary for driving the camera without increasing in size of the camera.

In FIG. 3, the fuel tank connected to the cell section and the valve are not shown.

Embodiment 2

Figure 4:
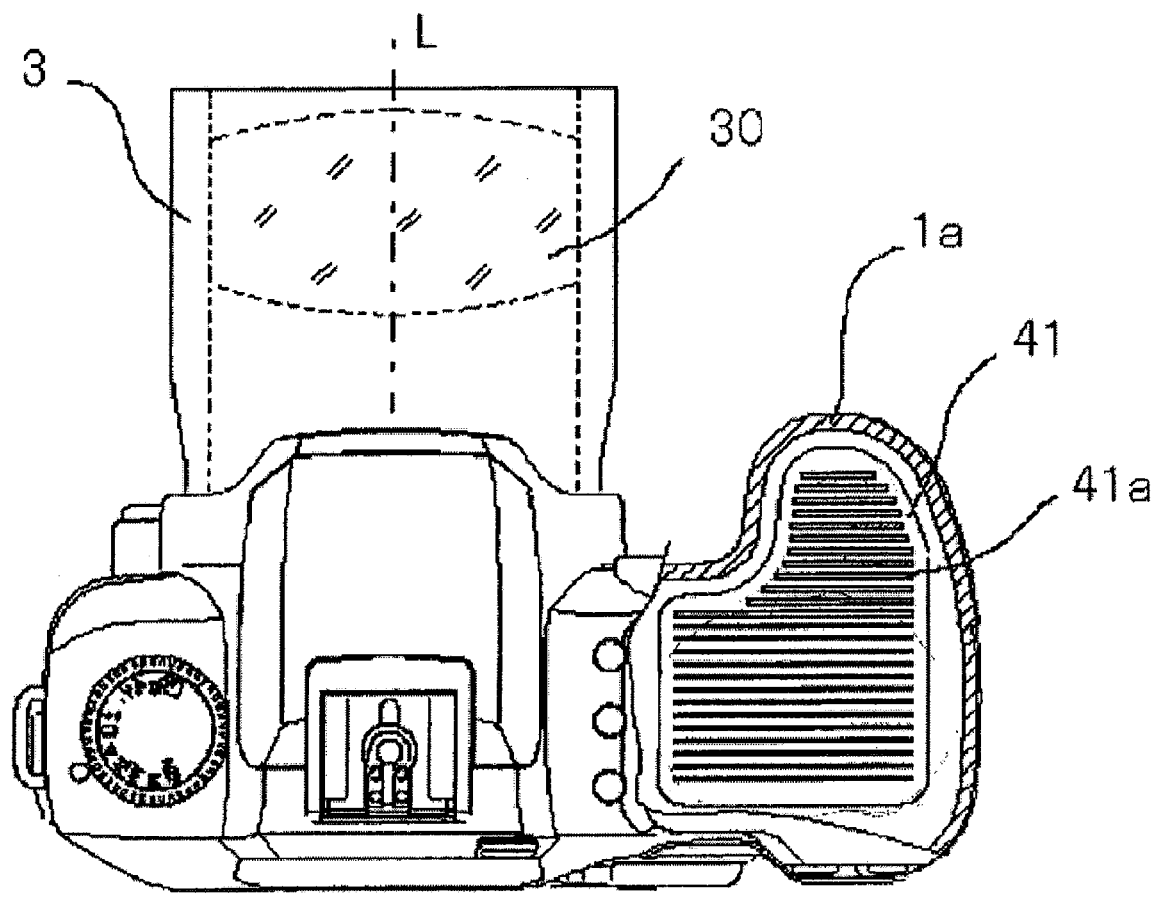
FIG. 4 is a sectional top view of a camera of Embodiment 2.

Next, a fuel cell of Embodiment 2 of the present invention will be explained using FIG. 4. FIG. 4 is a sectional top view of a camera of Embodiment 2; FIG. 4 shows a section of the neighboring part of a grip portion that is a part of the camera.

In the grip portion 1a protruding forward from the camera, a cell box 41 that is a power source is housed, the cell box 41 being connected to a fuel tank, not shown in the figure, via a valve. The cell box 41 has a shape following that of the grip portion 1a as Embodiment 1.

In the cell box 41, a plurality of cells 41a are laminated in the anteroposterior direction of the camera. The cells 41a arranged in the rear portion of the camera have the same length in the direction orthogonal to the lamination direction and the same area. The lengths of the cells 41a in the direction orthogonal to the lamination direction, which are arranged in the front portion of the camera, become smaller continuously or stepwise toward the front. The physical structure of each cell 41a is similar to that of Embodiment 1, and the explanation thereof will be omitted.

Moreover, the cells 41a arranged in the rear portion of the camera extend in the longitudinal direction beyond the region in the grip portion 1a. Thereby a larger cell 41a can be housed in the cell box 41. As a result, it becomes possible to ensure a sufficient voltage that is necessary for driving the camera without increasing in size of the camera.

Embodiment 3

Figure 5:
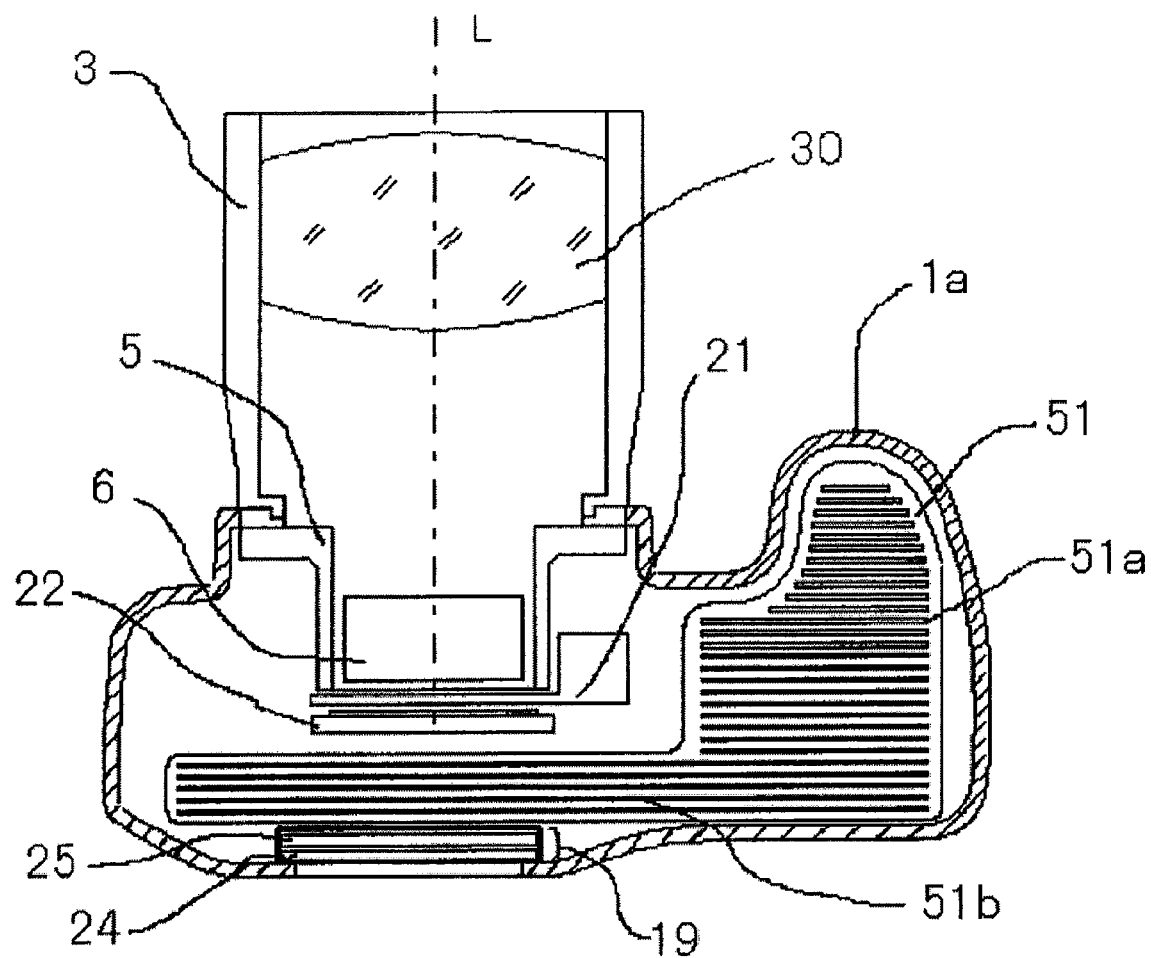
FIG. 5 is a sectional top view of a camera of Embodiment 3.

Next, a fuel cell of Embodiment 3 of the present invention will be explained using FIG. 5. FIG. 5 is a sectional top view of a camera of Embodiment 3; FIG. 5 shows a section of part where the fuel cell is arranged. The physical structure of each cell is similar to that of Embodiment 1, and the explanation thereof are omitted.

The mirror box 5 holding the quick-return mirror 6, which was explained in Embodiment 1, is arranged at the substantial center of the camera.

A focal plane shutter 21 is arranged behind the quick-return mirror 6, the focal plane shutter 21 being held by the mirror box 5.

An image-pickup device 22, such as a CCD sensor and a CMOS sensor, has an image-pickup plane orthogonal to an optical axis L of the image-taking lens 30. An object image formed on the image-pickup plane by the image-taking lens 30 is electrically converted into electric signals by the image-pickup device 22. The electric signals are recorded to recording media, not shown in the figure.

The color liquid crystal display portion 19 is constituted by a color liquid crystal monitor 25, a illumination light source 24 and a window on the camera.

The reference numeral 51 denotes a cell box constituting the fuel cell of the present embodiment, which comprises a front portion having a shape following the grip portion 1a;

and a rear portion extending in the longitudinal direction through a region between the image-pickup device 22 and the color liquid crystal display portion 19.

In the cell box 51, the plurality of cells 51a and 51b are laminated in the anteroposterior direction of the camera. The sizes of the cells 51a and 51b fit the shape of the cell box 51. Therefore, the length of the cells 51b arranged in the rear portion of the cell box 51 is larger in the direction orthogonal to the lamination direction than the cells 51a arranged in the front portion of the cell box 51, the length of the cells 51a becoming smaller toward the front.

As described above, in this embodiment, the length of the cells 51b arranged in the rear portion of the camera is set so as to extend to the region between the image-pickup device 22 and the color liquid crystal display portion 19 beyond the region in the grip portion 1a. As a result, it becomes possible to ensure a sufficient voltage that is necessary for driving the camera without increasing in size of the camera.

Embodiment 4

Figure 6:
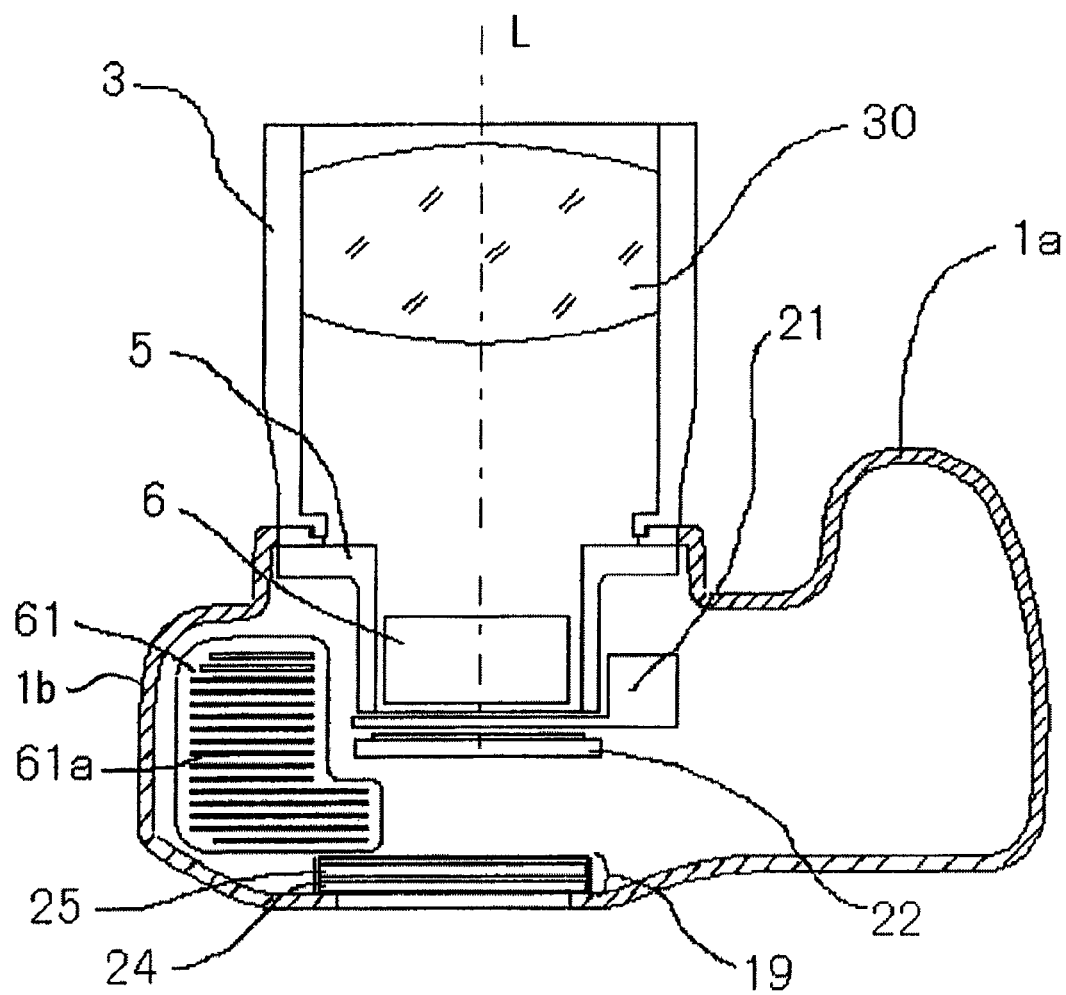
FIG. 6 is a sectional top view of a camera of Embodiment 4.

Next, a fuel cell of Embodiment 4 of the present invention will be explained using FIG. 6. FIG. 6 is a sectional top view of a camera of Embodiment 4; FIG. 4 shows a section of the part where the fuel cell is arranged. The physical structure of each cell arranged in a cell box described later is similar to that of Embodiment 1, and the explanation thereof are omitted.

In this embodiment, the cell box 61 is arranged in a region between the mirror box 5 and a left-side-exterior cover 1b, the region being a region across the optical axis L from the grip portion 1a that protrudes forward.

The cell box 61 has a shape following that of the left-side-exterior cover 1b. The rear portion of the cell box 61 protrudes slightly toward the grip portion 1a. In the cell box 61, the plurality of cells 61a are laminated in the anteroposterior direction of the camera; the length of each cell 61a is set to a length following the shape of the cell box 61. Therefore, the length of the cells 61a arranged in the rear portion of the cell box 61 is larger in the direction orthogonal to the lamination direction than the cells 61a arranged in the front portion of the cell box 51, and the length of the cells 61a becomes smaller toward the front according to the shape of the left-side-exterior cover 1b.

As described above, each cell 61a arranged in the rear portion of the camera has a large area by being extended to the region between the image-pickup device 22 and the color liquid crystal display portion 19. As a result, it becomes possible to ensure a sufficient voltage that is necessary for driving the camera without increasing in size of the camera.

As described above, according to Embodiments 1 to 4, since the size of at least one cell of the plurality of cells is different from another cell, it is possible to increase design freedom of fuel cells. As a result, because the shape of the fuel cell mounted in an electronic apparatus as a power source can be set so as to fit the space in the electronic apparatus, generation of wasted space can be prevented. Moreover, since the size of the cell can be changed and the lamination number of the cells can be increased according to the space in the electronic apparatus, it becomes possible to increase the output voltage of the fuel cell without increasing in size of the electronic apparatus.

Moreover, it becomes possible to use the space in the grip portion effectively by arranging the cell portion in the grip portion. Thereby, it becomes possible to increase the supplying power of the fuel cell without increasing in size of the electronic apparatus.

Embodiment 5

Figure 8:
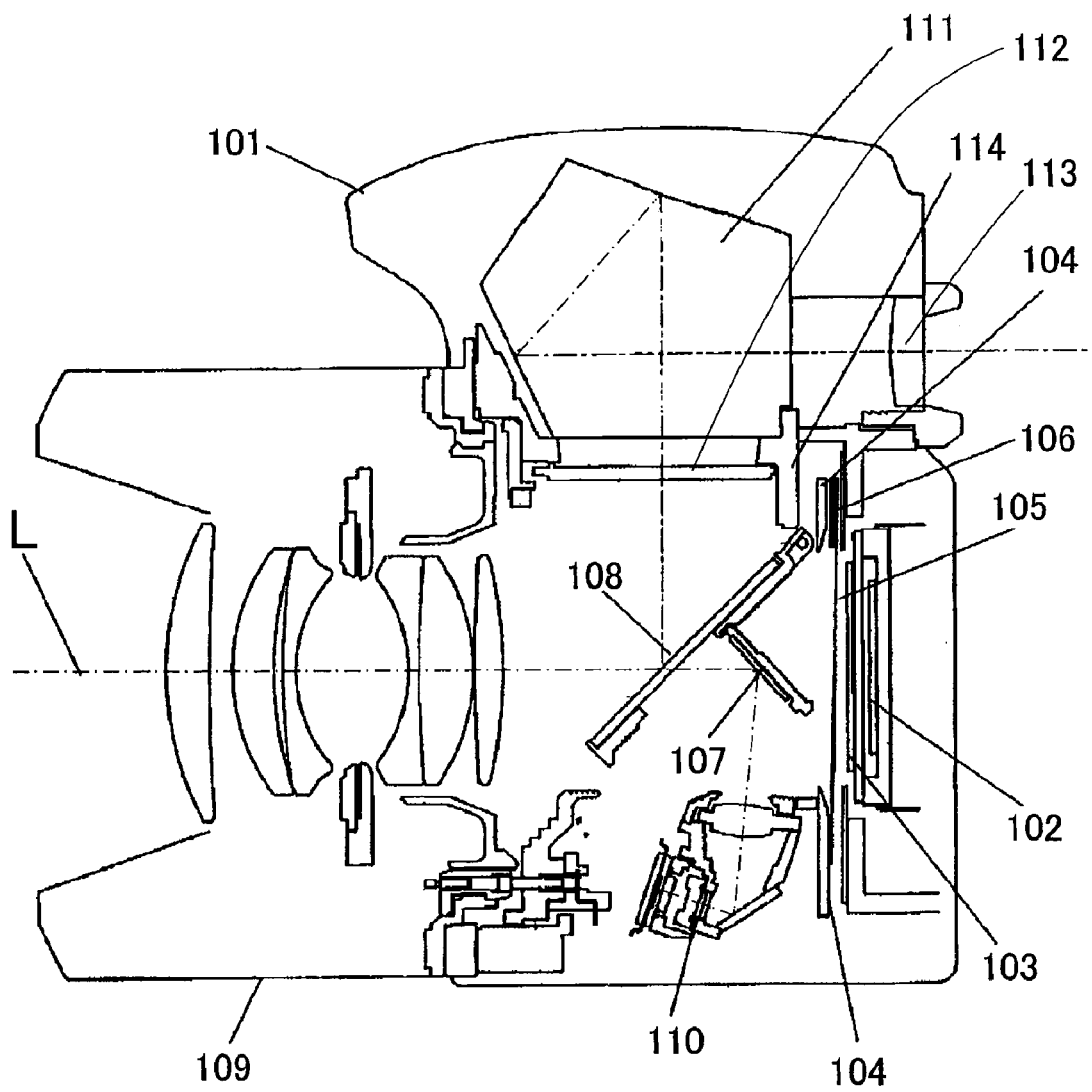
FIG. 8 is a center sectional view of a camera of Embodiment 5 of the present invention.

FIG. 8 shows the structure of a camera (electronic apparatus) that is Embodiment 8 of the present invention. The reference numeral 101 denotes a camera body. An interchangeable lens 109 is detachably attached to the center of the camera body 101. The light flux that has passed through the interchangeable lens 109 is incident on the main mirror 108 arranged obliquely with respect to an image-taking optical axis L. The main mirror 108 is a half mirror; the light flux reflected on the main mirror 108 is led to a finder optical system 111 through a focusing screen 112, and then led to an eye of a user from the finder optical system 111 through an eyepiece lens 113.

The light flux that has passed through the main mirror 108 is reflected downward by a sub mirror 107, which is foldably attached to the main mirror 108, and is led to a focus detection unit 110. When an image-taking operation starts, the main mirror 108 moves upward to retreat from the image-taking optical path, and the sub mirror 107 is folded with respect to the main mirror 108.

An aperture mask 104 of a focal plane shutter unit, which restricts the incidence of leaking light is arranged behind (at a position closer to an image plane than) the main and sub mirrors 108 and 107. In a non-exposure state, the aperture of the aperture mask 104 is shut with an opening curtain 105 of the shutter unit, the opening curtain 105 being movable to open and shut the aperture on a plane including a direction orthogonal to the optical axis L.

An optical filter 103 that is an integrated combination of an optical low-pass filter and an infrared-cut filter is arranged behind the shutter unit.

When the image-taking operation starts and the opening curtain 105 is driven in the open direction, the light flux that has passed through the aperture of the aperture mask 104 is transmitted through the optical filter 103, and then forms an image on a light-receiving plane of an image-pickup device 102, which is arranged behind the optical filter 103.

Each sensor element of the image-pickup device 102 accumulates electric charge according to the light amount of the image formed on the light-receiving plane. Then, the image-pickup electric charge data of each horizontal line of the image-pickup device is scanned and read out by an electric charge reading circuit, not shown in the figure. A closing curtain 106 is driven in the shut direction when a predetermined time has elapsed, and thereby blocking the light flux directing to the image-pickup device 102 again.

The output signal, that is an analog signal, from the image-pickup device 102 undergoes a predetermined process such as conversion to a digital signal by an A/D converter and image compression by an image compressing circuit, and then is recorded as image data to a recording media, not shown in the figure.

Figure 10A:
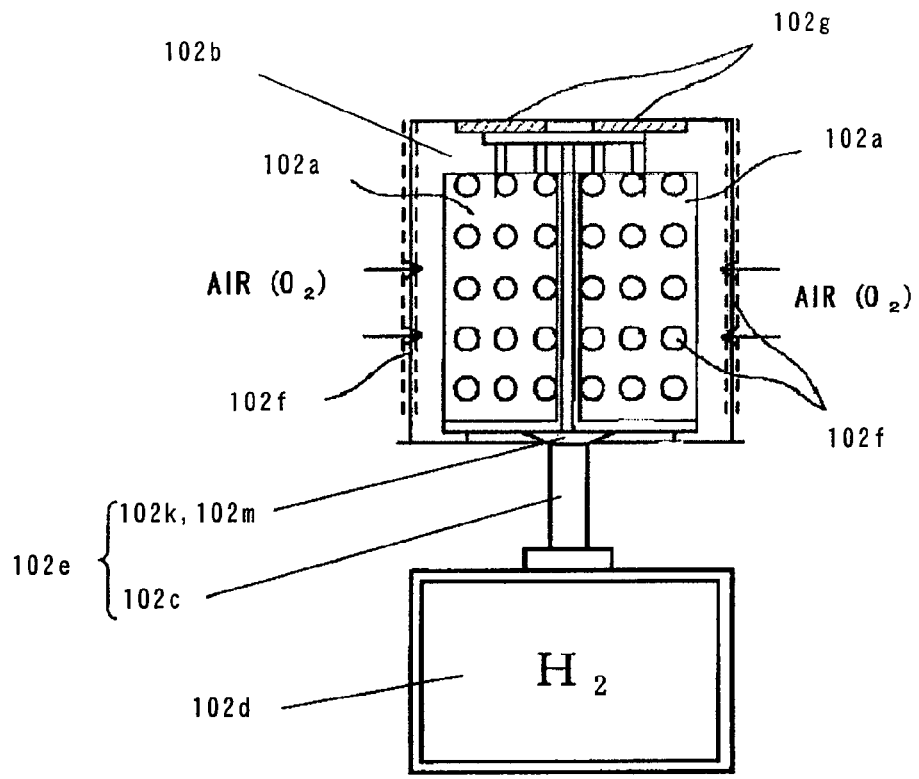
FIGS. 10A and 10B are detail views of a fuel cell in the camera of Embodiment 5.
Figure 10B:
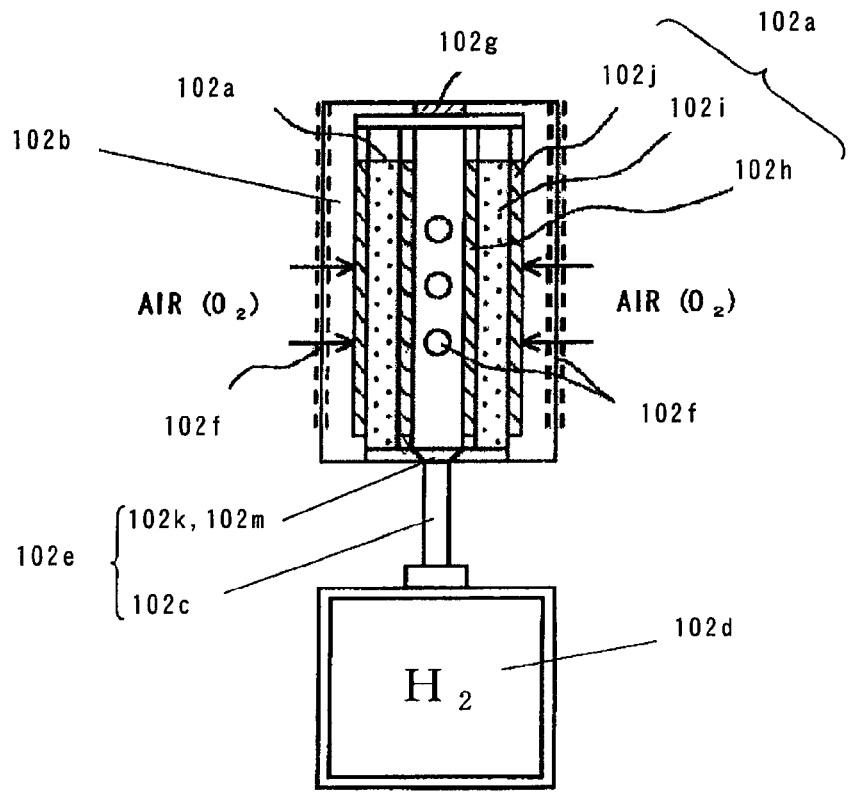

FIGS. 10A and 10B show the exterior of the camera; a part of the exterior member is omitted so that the fuel cell can be seen in the figure. FIG. 10A is a top outline view of the camera, and FIG. 10B is a front outline view of the camera.

A grip portion 101a protruding forward is provided on the camera body 101. A user can hold the camera easily and stably by gripping the grip portion 101a at the time of image-taking. The reference numeral 113 denotes a mount portion on which the interchangeable lens 109 is mounted. The reference numeral 114 denotes a mirror box provided in the camera body 101, which is arranged so as to surround the image-taking optical path. The main mirror 108, which leads light from the interchangeable lens 109 to the finder optical system 111 is held in the mirror box 114; the main mirror 108 is arranged obliquely in the image-taking optical path so as to form an angle of about 45 degrees with the optical axis L at the time of object observation.

A shutter button 115, a main operation dial 116 and an LCD panel 117 are provided in the left area (when viewed from the front) of the top of the camera. The shutter button 115 is a button for indicating a start of image-taking operation to the camera. The main operation dial 116 is a dial for setting a shutter speed and lens aperture value in accordance with an operation mode at the time of image-taking. The LCD panel 117 displays operation modes of the camera. On the right side of the LCD panel 117, a mode setting button 118 is provided. The mode setting button 118 is operated for selecting a continuous shooting mode and a single shooting mode, and setting a self-image-taking mode. The LCD panel 117 displays the setting situation by the mode setting button 118.

A flash unit 119 popping up from the camera body 101, a shoe groove 120 for mounting an external flash apparatus (not shown in the figure) and a flash contact 121 are provided in the center area in the top of the camera. An image-taking-mode-setting dial 122 is provided in the right area in the top of the camera.

A color liquid crystal display portion, which can display color images and is not shown in the figure, is provided at the center of the back face of the camera body 101. The user can confirm taken images through the color liquid crystal display portion.

In the grip portion 101a provided on the left side of the interchangeable lens 109 when viewed from the front, a cell section 102b in which a plurality of cells 102a are laminated is provided. The cell section 102b is connected to a fuel tank 102d through a fuel feed path 102c extending in the vertical direction in the figure.

The fuel tank 102d is arranged below the grip portion 101a and near the exterior member of the camera. The focus detection unit 110 is provided on the right side of the fuel tank 102d when viewed from the front.

The fuel tank 102d is mounted to the fuel feed path 102c when using the camera. Refill of the fuel to the fuel cell is performed by replacing the fuel tank 102d.

The cell section 102b can be attached to and detached from the camera in a state in which the fuel tank 102d is detached from the camera. The cell section 102b can be replaced when it deteriorated and power generation efficiency thereof reduced.

In the bottom area of the exterior of the camera body 101, a fuel cell cover 101b, which can cover an opening of a tank housing portion in which the fuel tank 102d is housed, is provided. Opening the fuel cell cover 101b and then ejecting the fuel tank 102d that has been connected to the fuel feed path 102c from the housing portion make it possible to replace the fuel tank 102d.

FIGS. 10A and 10B show an example of the detailed structure of the fuel cell of the present embodiment. FIG. 10A is a plain view of the fuel cell, and FIG. 10B is a front view of the fuel cell.

The fuel cell has air holes 102f in its outer circumferential faces of the cell section 102b for taking outside air in the cell section 102b. Oxygen included in the outside air is used as an oxidizer in reaction. Vapor of water generated by the reaction and heat generated in the cell section 102b are exhausted through the air holes 102f outside the cell section 102b. Therefore, the air holes 102f have a structure that is easy to connect to the outside of the camera (outside air). Electrodes 102g for outputting electric power generated in the fuel cell are provided in one of short-side faces of the cell section 102b.

The fuel cell comprises the cell section 102b constituted by a fuel electrode 102h, polyelectrolyte film 102i, oxidizer electrode 102j and catalyst, a fuel tank 102d reserving fuel, and a fuel feed section 102e. The fuel feed section 102e comprises the fuel feed path 102c connecting the fuel tank 102d to the cell section 102b, a pressure sensor 102k measuring pressure of the fuel, and a fuel feed port 102m connecting the cell section 102b to the fuel feed path 102c.

In FIGS. 10A and 10B, the cell section 102b comprises two cells 102a that are laminated. However, the lamination number of the cells can increase more than in FIGS. 10A and 10B to obtain a sufficient voltage that is necessary for driving the camera. The explanation about the lamination number of the cells 102a will be given later.

In the present embodiment, the fuel reserved in the fuel tank 102d is hydrogen. However, the structure of a DMFC-type fuel cell using methanol as fuel is basically similar to the fuel cell of the present embodiment. The fuel is fed to the fuel electrode 102h of each cell 102a that constitutes the cell section 102b from the fuel tank 102d through the fuel feed path 102c. Air is used as oxidizer gas; the air is fed to the oxidizer electrode 102j through the air holes 102f.

The electric power that is generated by one cell 102a has an electromotive force of about 0.8V and a current density of about 300 mA/cm$^2$. Therefore, when the fuel cell is used as an electric power source of a digital single-lens reflex camera, it is necessary to increase the whole output of the fuel cell by connecting the plurality of cells 102a in series to increase the voltage or enlarging the area of the cell 102a to increase the current.

Figure 9A:
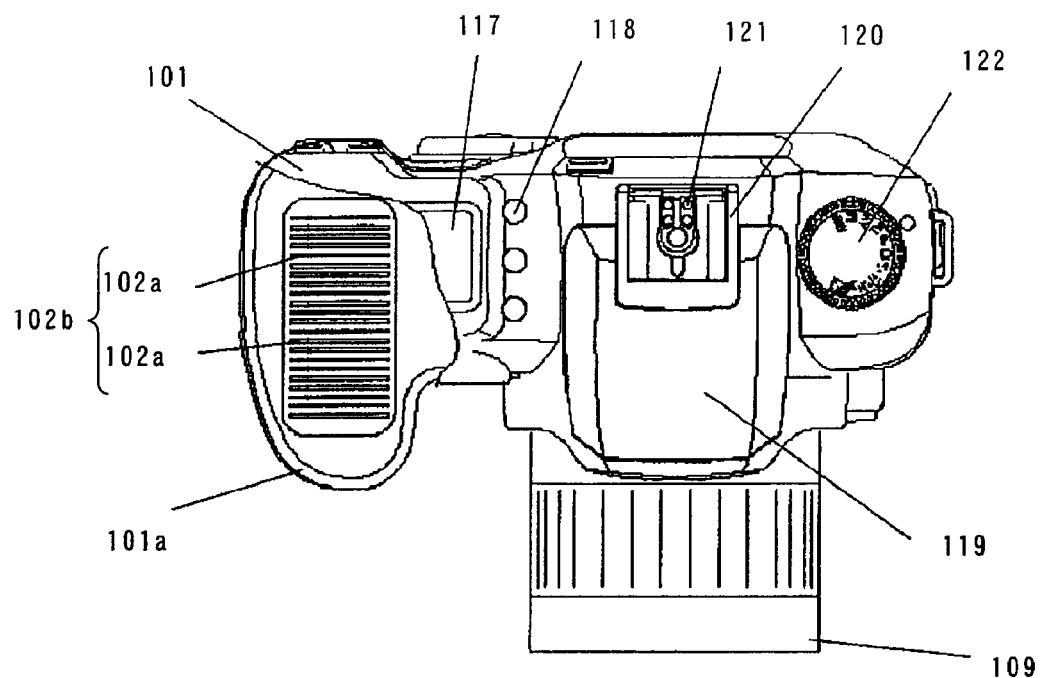
FIGS. 9A and 9B are outline views of the camera of Embodiment 5.
Figure 9B:
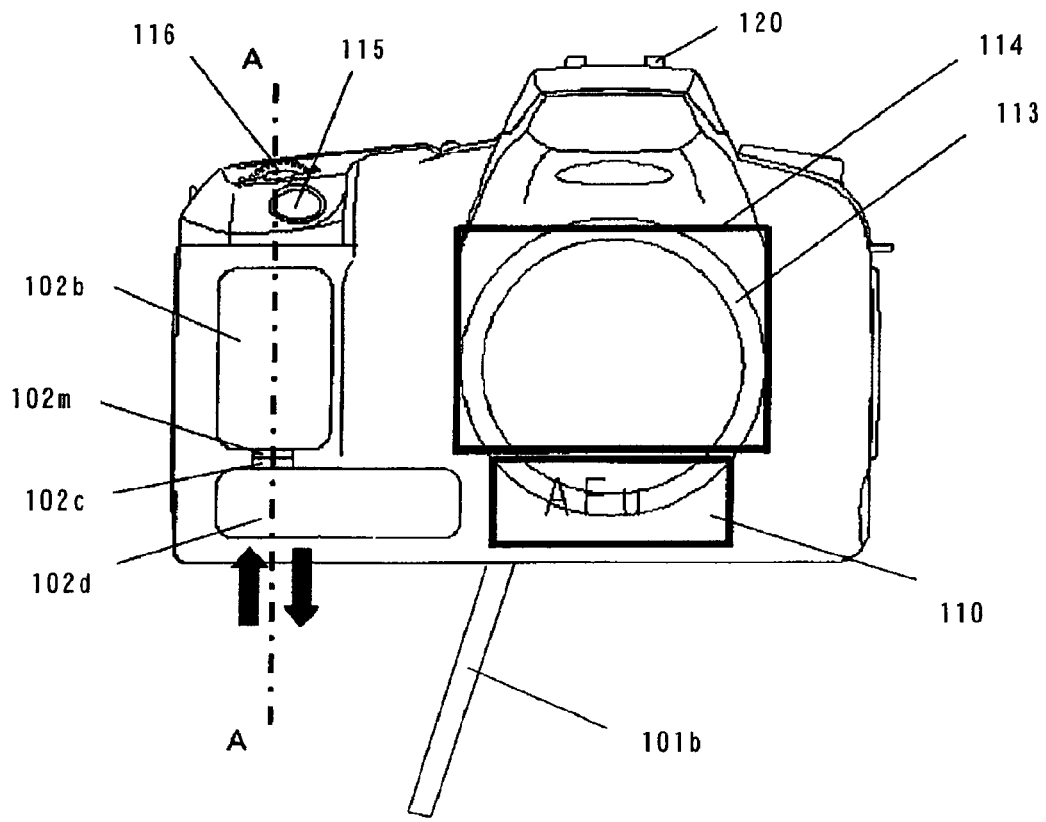
Figure 11:
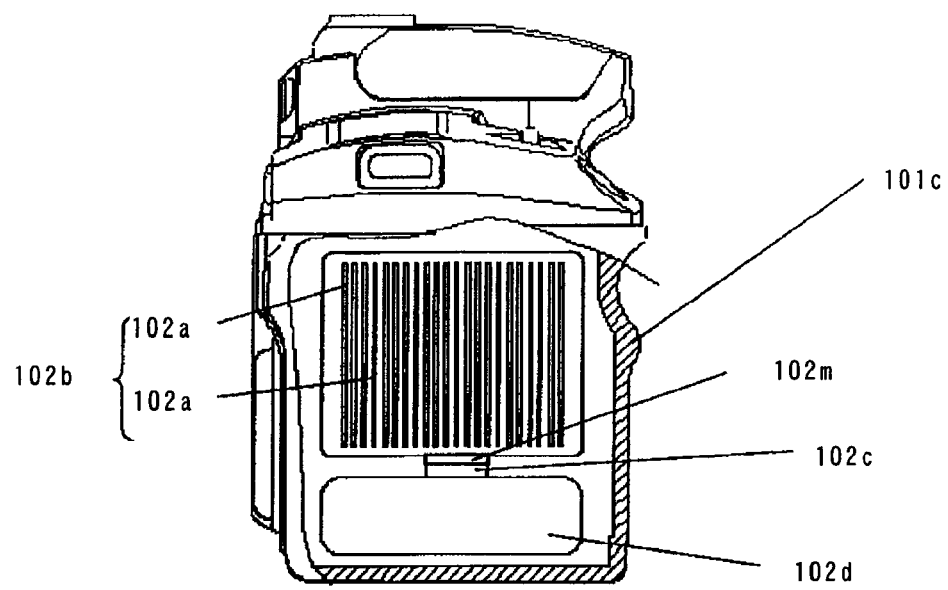
FIG. 11 is a sectional view at A-A in FIG. 9 of the camera of Embodiment 5, which is viewed from the left side.

In the present embodiment, the plurality of cells having the same size and being laminated are arranged in the grip portion 101a that protrudes forward (see FIGS. 9A, 9B and 11; FIG. 11 is a left side sectional view of the camera along the line A-A in FIG. 9B.). Since this can increase the lamination number of the cells 102a in response to the protrusion amount of the grip portion 101a more than in a case where the cells 102a are arranged in other regions, it is possible to increase the output voltage of the fuel cell. Moreover, since the cell section 102b is arranged in the space inside the grip portion 101a, which is an empty space originally, it is possible to use the space effectively and miniaturize the camera.

Furthermore, the fuel tank 102d is arranged below the cell section 102b, and the fuel feed section 102e is arranged between the fuel tank 102d and the cell section 102b. In addition, the fuel feed port 102m of the cell section 102b is arranged at substantially the center of the cell section 102b in the lamination direction of the cells 102a (see FIGS. 9A, 9B and 11). By arranging the fuel feed port 102m at such a position, hydrogen that is the fuel is fed effectively to each cell 102a.

In the present embodiment, the lamination direction of the cells 102a is set to the optical axis direction (thickness direction of the camera). However, the lamination direction can be set to the longitudinal direction of the camera. In the case where the cells 102a are laminated in the longitudinal direction, it becomes possible to increase the area of each cell 102a in response to the protrusion amount of the grip portion 101a. This can increase the output voltage of the fuel cell.

Embodiment 6

Figure 12:
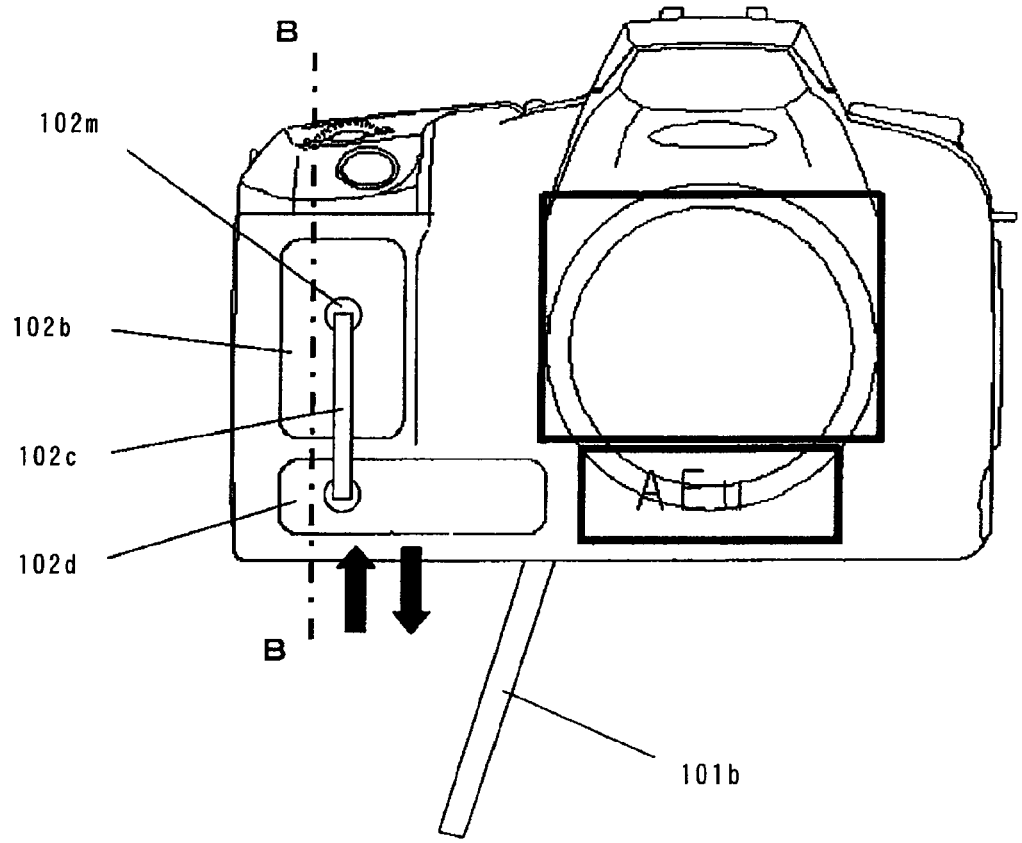
FIG. 12 is an outline view of the camera of Embodiment 6 of the present invention.

FIG. 12 is an exterior view of a camera (digital single-lens reflex camera) of Embodiment 6 of the present invention; a part of the exterior member is omitted so that the fuel cell can be seen in the figure. In this embodiment, the structure of the camera to which this embodiment is applied is similar to that of the camera of Embodiment 5, and description of common components is omitted by attaching the same reference numerals to them.

Figure 13:
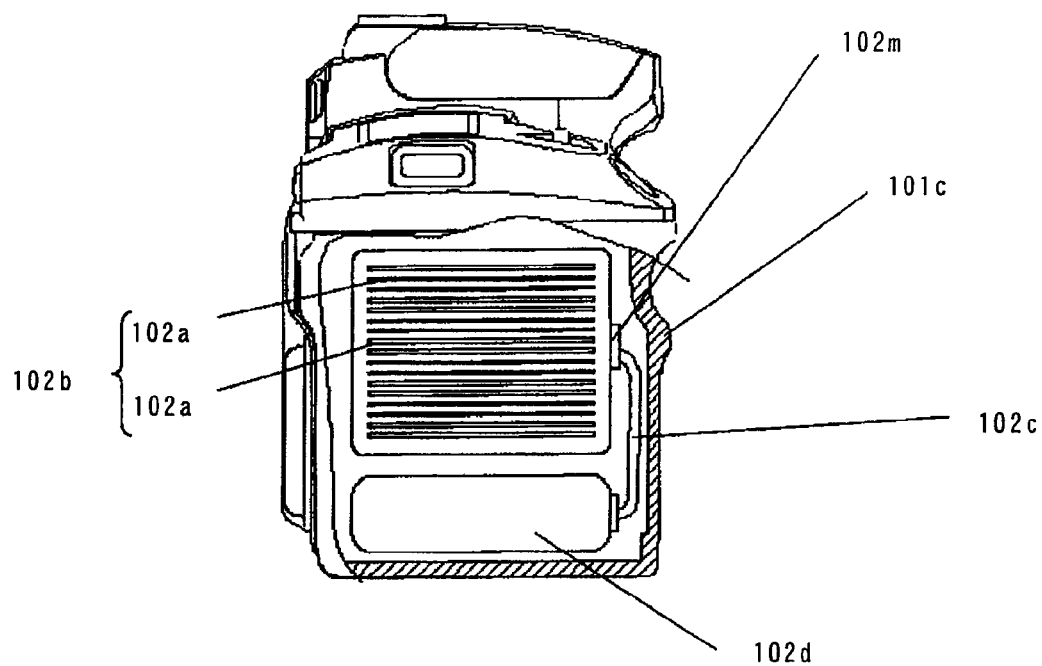
FIG. 13 is a sectional view at B-B in FIG. 12 of the camera of Embodiment 6, which is viewed from the left side.

FIG. 13 is a left side sectional view of the camera along the line B-B in FIG. 12. As shown in FIGS. 12 and 13, in the grip portion 101a, a plurality of cells 102a are laminated in the vertical direction of the camera.

Since this arrangement can increase the lamination number of the cells 102a according to the height of the grip portion 101a, it is possible to increase the output voltage of the fuel cell. Moreover, since the cell section 102b is arranged in the space inside the grip portion 101a that is an empty space originally, it is possible to use the space effectively and to miniaturize the camera.

Furthermore, the fuel tank 102d is arranged below the cell section 102b, and the fuel feed port 102m of the cell section 102b is arranged inside a protruding portion 101c on which a user's finger is put, which is formed on the grip portion 101a. In addition, the fuel feed port 102m is arranged at substantially the center of the cell section 102b in the lamination direction of the cells 102a (see FIGS. 9A, 9B and 11). By arranging the fuel feed port 102m at such a position, hydrogen that is the fuel is fed effectively to each cell 102a.

According to Embodiments 5 and 6, by arranging the cell section in the grip portion, it becomes possible to use the space in the grip portion effectively and to miniaturize the camera.

Moreover, since the grip portion protrudes toward outside of the camera, it is possible to increase the lamination number of the cells or the area of each cell. As a result, it becomes possible to increase the supplying power from the fuel cell while miniaturizing the camera.

In Embodiments 5 and 6, the camera having a replaceable fuel cell was explained. However, there is no intention to limit the present invention to the specific forms disclosed. In the present invention, for example, both the fuel cell and fuel tank can be fixed in the camera body. In this case the fuel is refilled to the fuel tank fixed in the camera body.

Embodiment 7

Figure 16:
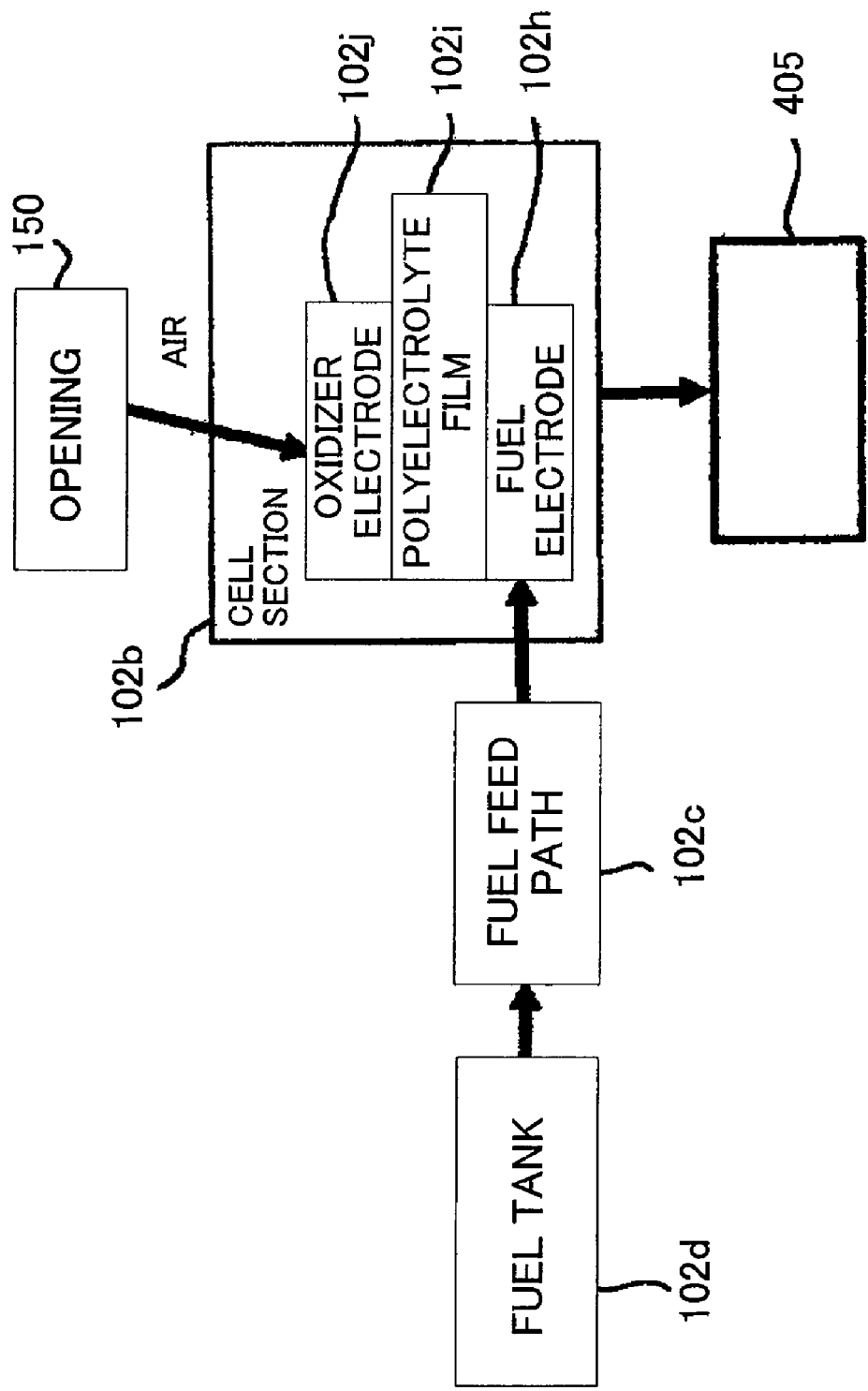
FIG. 16 is a block diagram showing the structure of the fuel cell.

Next, the description about a camera of Embodiment 7 of the present invention will be given using FIG. 14. In this embodiment, the structure of the camera to which this embodiment is applied is similar to that of the camera of Embodiment 5 in FIG. 8, and description of common components is omitted by attaching the same reference numerals to them. The camera also uses a fuel cell as a power source. The structure of the fuel cell to which this embodiment is applied is similar to that of the fuel cell of Embodiment 5, and description of common components is omitted by attaching the same reference numerals to them. FIG. 16 is a block diagram showing the structure of the fuel cell.

A fuel tank 102d reserves fuel (including hydrogen), the fuel in the tank 102d being fed to a fuel electrode 102h in a cell section 102b through a fuel feed path 102c. The cell section 102b comprises the fuel electrode 102h, an oxidizer electrode 102j, a polyelectrolyte film 102i arranged between the fuel electrode 102h and the oxidizer electrode 102j. In addition, a catalyst for accelerating a reaction is provided between the fuel electrode 102h and the oxidizer electrode 102j and between the oxidizer electrode 102j and the polyelectrolyte film 102i, respectively.

When the fuel in the fuel tank 102d is fed to the fuel electrode 102h through the fuel feed path 102c, the fuel including hydrogen or hydrogen ion is oxidized. Thereby, electrons (e−) and hydrogen ions (H+) are generated. Then, the hydrogen ions move from the fuel electrode 102h to the oxidizer electrode 102j through the polyelectrolyte film 102i, and reacts with oxidizer gas to form water. Oxygen included air outside the camera is used as the oxidizer.

The oxygen included the outside air is fed to the oxidizer electrode 102j of the cell section 102b through openings 150 that are formed in the top face of the grip portion 101a of the camera body 101.

The electrons (e−) generated by oxidization of the fuel, which includes hydrogen and has been fed to the fuel electrode 102h, move from a negative-electrode terminal provided at the end of the fuel electrode 102h to a positive-electrode terminal provided at the end of the oxidizer electrode 102j. AS a result, direct-current electricity is generated and supplied to an external load (electric component provided in the camera body 101).

In addition, binding the hydrogen ions and the oxygen generates water, and vapor of the water is exhausted from the camera body through the openings 150.

Figure 14:
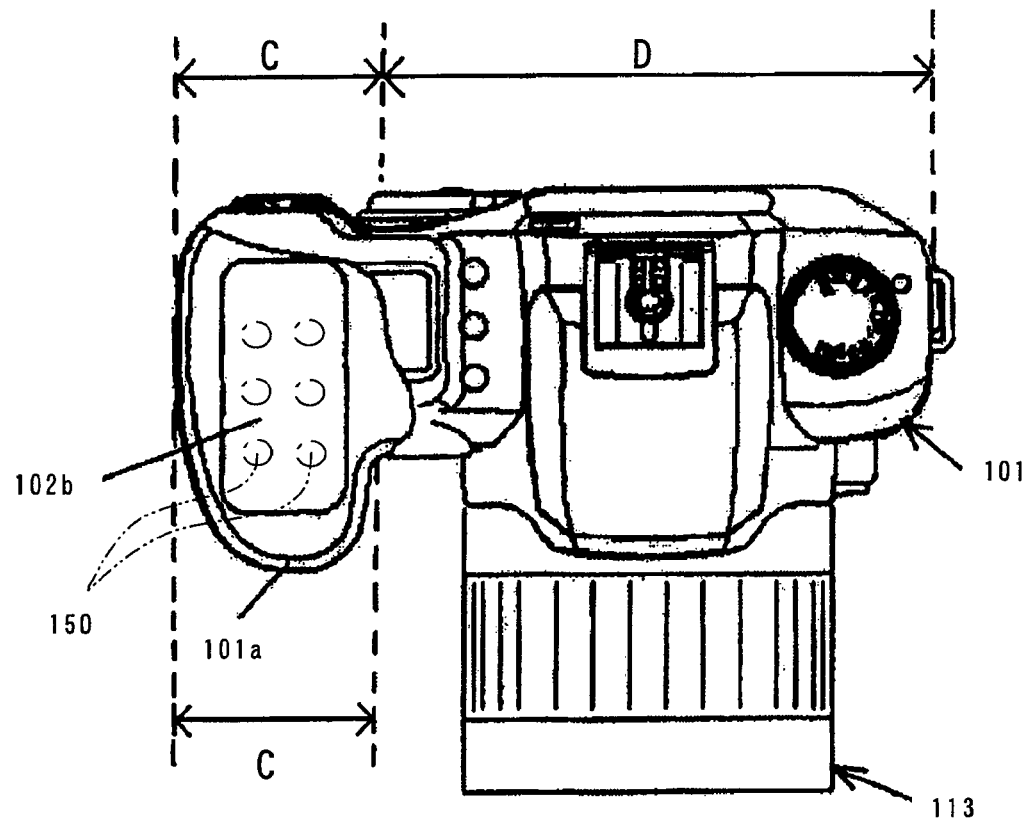
FIG. 14 is a top view of a camera system of Embodiment 7 of the present invention.
Figure 15:
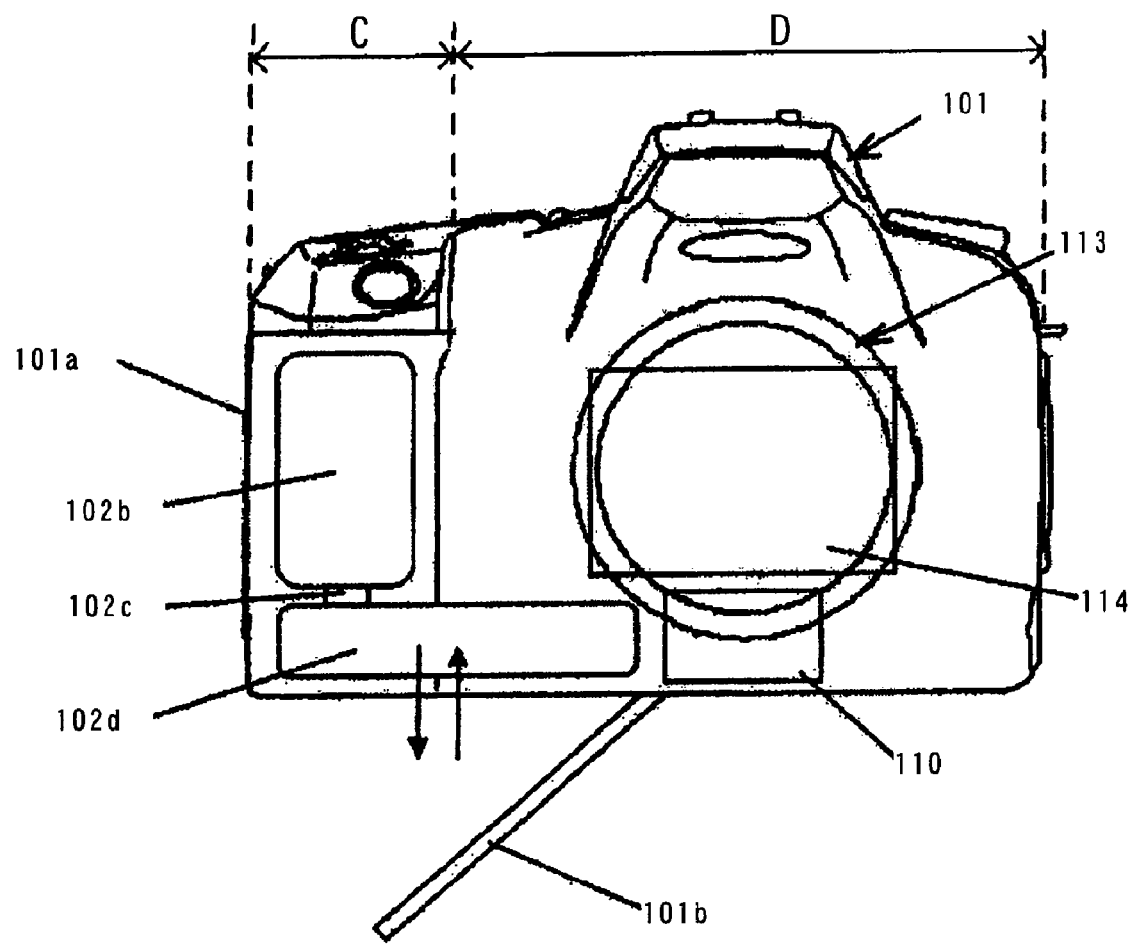
FIG. 15 is a front view of the camera system of Embodiment 7.

FIG. 14 is a top view of the camera; the internal structure of the grip portion 101a is shown in the figure. FIG. 15 is a front view of the camera; a part of the internal structure of the camera is shown in the figure.

A user grips the grip portion (a second body) 101a of the camera body 101 when using the camera. In FIGS. 14 and 15, the grip portion 101a corresponds to a portion shown in the region C of the camera exterior member. Moreover, the grip portion 101a includes a protruding part in the front face of the camera body 101 as shown in FIG. 14.

An interchangeable lens 113 is mounted on a first body that is a part other than the grip portion 101a of the camera exterior member, that is a portion shown in the region D in FIGS. 14 and 15. In the first body, a mirror box 114, an image-pickup device 2 (see FIG. 8) and focus detection unit 110, etc. are provided.

The cell section 102b of the fuel cell is arranged in the grip portion 101a. The shape of the cell section 102b is a shape following the shape of the grip portion 101a as above-mentioned embodiments. This makes it possible to use the space in the grip portion 101a effectively. In addition, the cell section 102b constituted by laminating a plurality of cells makes it possible to generate a higher output electric power. Moreover, enlarging the area of each cell makes it possible to generate a larger electric current.

Openings 101c are provided in the top face of the grip portion 101a of the camera body 101 as shown in FIG. 14. Oxygen in the outside air is fed to the oxidizer electrode 102j in the cell section 102b. These openings 101c in the top face of the grip portion 101a of the camera body 101 are closer to the cell section 102b than in a case where the openings are provided other portion. Thereby, it is possible to feed the outside air (oxygen) to the cell section 102b and exhaust the vapor generated in the cell section 102b effectively.

As shown in FIG. 15, in the camera body 101, the fuel tank 102d is arranged below the cell section 102b (between the cell section 102b and the bottom face of the camera body 101). Moreover, the fuel tank 102d is provided in the grip portion (second body) 101a and the first body of the camera body 101. The fuel tank 102d is connected to the cell section 102b with the fuel feed path 101c arranged (fixed) in the grip portion 101a.

As described in Embodiment 5, the fuel tank 102d can be attached to and detached from the fuel feed path 101c. The fuel tank 102d is attached thereto when using the camera The fuel tank 102d detached therefrom when the fuel tank 102d is empty, and then new fuel tank 102d filled with the fuel is attached to the fuel feed path 101c. In other words, it is possible to use the fuel cell continuously by just replacing the fuel tank 102d. Furthermore, since it is unnecessary to refill the fuel to the fuel tank 102d, which is a cumbersome operation, the usability of the camera is improved.

In this embodiment, the fuel tank 102d is detachably attached to the fuel feed path 102c. However, the fuel tank can be fixed in the camera body 101. In this case, the fuel is refilled to the fuel tank fixed in the camera body 101.

A fuel cell cover 101b is provided in the bottom of the camera body 101; the fuel cell cover 101b opens and closes an opening of a housing portion for the fuel cell. The fuel cell cover 101b is provided in the regions C and D as shown in FIG. 15. Opening the fuel cell cover 101b makes it possible to replace the fuel tank 102d.

The mirror box 114 holding the above-mentioned main mirror 108 rotatably is arranged behind the above-mentioned interchangeable lens 113 (image plane side of the mirror box 114). The focus detection unit 110 is arranged in the region below the mirror box 114 in the camera body 101 (region between the mirror box 114 and the bottom face of the camera body 101). The longitudinal length of the focus detection unit 110 is shorter than that of the mirror box 114 as shown in FIG. 15.

In the region between the mirror box 114 and the bottom face of the camera body 101, a part of the fuel tank 102d is arranged in the space generated by the difference between the lengths of the focus detection unit 110 and mirror box 114. That is to say, a part of the fuel tank 102d and the mirror box 114 overlap in the vertical direction. In other words, a part of the fuel tank 102d is arranged between the bottom face of the camera body 101 and an optical path space through which light passes toward the image-pickup device 2 (see FIG. 8).

Since the cell section 102b of the fuel cell is arranged in the grip portion 101a of the camera body 101, it is possible to ensure a sufficient space for housing the cell section 101b without increasing in size of the camera body 101, as compared to a case where the cell section 102b is arranged in other regions. Thereby, it is possible to constitute the cell section 102b by laminating a plurality of cells to generate a higher output electric power. Moreover, it is possible to enlarge the area of each cell to generate a larger electric current.

Furthermore, since the fuel tank 102d is arranged below the cell section 102b in the camera body 101 and the fuel cell cover 101b is provided in the bottom of the camera body 101, it is possible to replace the fuel tank 102d having a high exchange frequency easily by just opening the fuel cell cover 101b. Moreover, since it is possible to use the fuel cell continuously by just replacing the fuel tank 102d, the usability of the camera is improved.

Furthermore, in the region below the mirror box 114, the fuel tank 102d extends to the region generated by the longitudinal length difference between the focus detection unit 110 and the mirror box 114. Therefore, it is possible to increase the capacity of the fuel tank 102d more than a case where the fuel tank is arranged in only the space in the grip portion 101a. Increasing the capacity of the fuel tank 102d makes it possible to increase the electric power capacity of the fuel cell.

In addition, since the fuel tank 102d is arranged using the space (dead space) generated by the size difference between the focus detection unit 110 and the mirror box 114, it is possible to use the space in the camera body 101 effectively without increasing in size of the camera body 101.

In this embodiment, the cell section 102b and the fuel feed path 102c are fixed in the grip portion 101a. However, the structure in which at least one of the cell section 102b and the fuel feed path 102c can be detached from the grip portion 101a can be adopted.

In the cell section of the fuel cell, deterioration in power generation efficiency may occur owing to consumption of the catalyst by long hours use and deterioration in the polyelectrolyte film. In addition, deterioration in the fuel feed path may also occur owing to long hours use. Furthermore, the cell section and fuel feed path may damage owing to a shock from the outside.

Therefore, the above-mentioned structure in which the cell section 102b and the fuel feed path 102c can be detached from the grip portion 101a makes it possible to replace the deteriorated cell section and fuel feed path easily. In this case, by opening the fuel cell cover 101b and then detaching the cell section 102b and the fuel feed path 102c with the fuel tank 102d, the cell section 102b and the fuel feed path 102c can be replaced.

Furthermore, in this embodiment, a part of the fuel tank 102d is located in the region below the mirror box 114 as described above, it is not necessarily that the mirror box 114 is located there. In other words, the fuel tank 102d can be arranged using not only the space in the grip portion 101a but also the space in the camera body 101 other than the grip portion 101a. This makes it possible to increase the capacity of the fuel tank 102d more than a case where the fuel tank 102d is arranged in only the grip portion 101a.

Moreover, a plurality of fuel tanks can be provided in the camera body 101. For example, one fuel tank is provided in the grip portion 101a and another fuel tank is provided in a region in the camera body 101 other than the grip portion 101a; the fuel is fed to the cell section 102b in the grip portion 101a from these fuel tanks through fuel feed paths. The plurality of fuel tanks can be detachable from the camera body 101 or fixed to the camera body 101.

Embodiment 8

Figure 17:
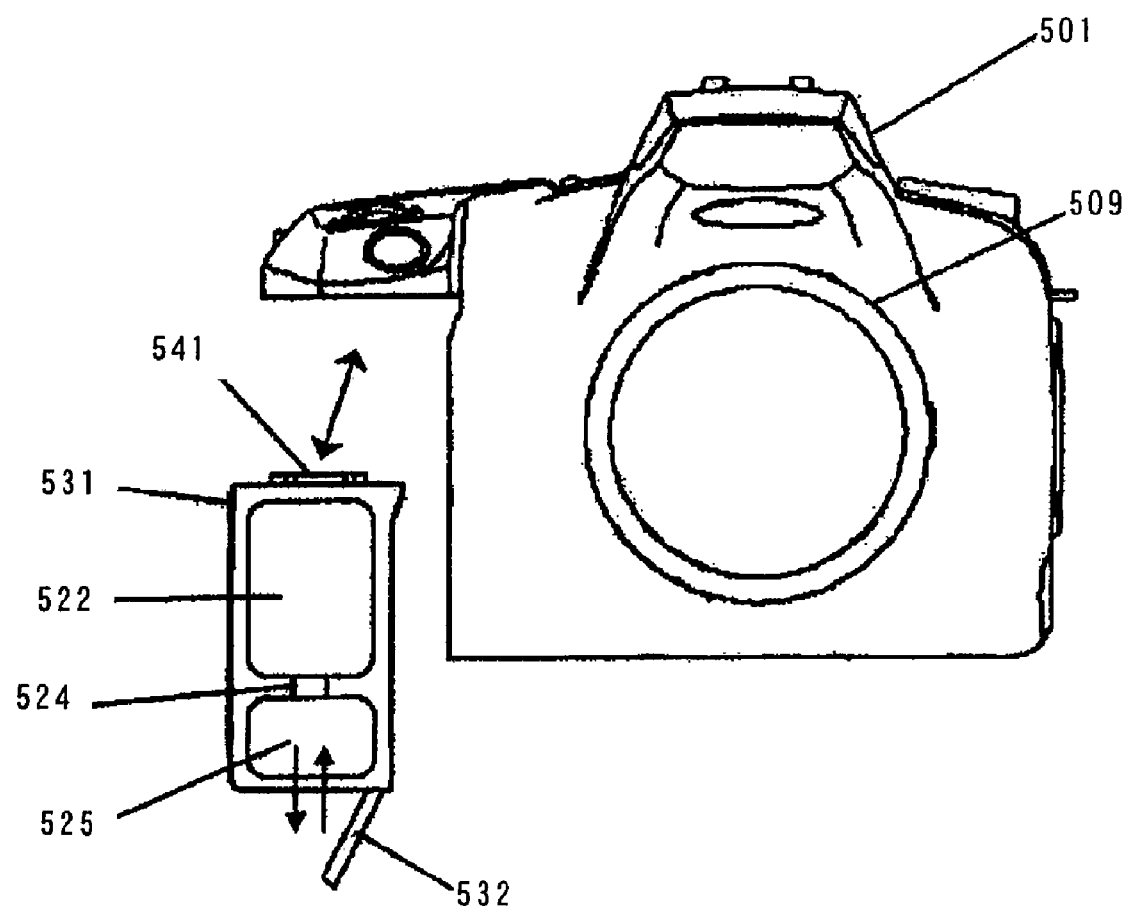
FIG. 17 is a front view of a camera system of Embodiment 8 of the present invention.

FIG. 17 is an outline view of a camera of Embodiment 8 of the present invention, the figure showing the structure of the camera when viewed from the front.

In this embodiment, an interchangeable lens 509 is detachable from the camera body 501. The reference numeral 509 denotes a mount portion on which the interchangeable lens 509 is attached.

A grip unit 531 that is gripped by a user, which is a second body, is detachably attached to the camera body 501, which is a first body and holds an image-pickup device, etc. A cell section 522, fuel feed path 524 and fuel tank 525 that constitute a fuel cell are arranged in the grip unit 531. The fuel tank 525 is detachable from the fuel feed path 524.

When the grip unit 531 is attached to the camera body 501, the electric power generated by the fuel cell (cell section 522) is fed to each electronic component provided in the camera body 501 through a fuel cell contact 524 provided on the grip unit 531.

A fuel cell cover 532 is provided in the bottom face of the grip unit 531, the fuel cell cover 532 opening and closing an opening of a housing portion for the fuel cell. By opening the fuel cell cover 532, the fuel tank 525 that is empty can be replaced to a new fuel tank filled with fuel.

In the camera of the present embodiment, since the grip unit 531 equipped with the fuel cell can be detached from the camera body 501, it is possible to replace the fuel tank 525 in a state in which the grip unit 531 is separated from the camera body 501.

In this embodiment, the cell section 522 and fuel feed path 524 are fixed to the grip unit 531. However, the structure in which at least one of the cell section 522 and the fuel feed path 524 can be detached from the grip unit 531 can be adopted.

In this case, it is possible to replace the cell section 522 and fuel feed path 524 in a state in which the grip unit 531 is separated from the camera body 501. Thereby, it is possible to replace the cell section 522 and fuel feed path 524 easily as compared to a case where the cell section and fuel feed path are replaced in a state in which the grip unit is fixed to the camera body.

In contrast, the structure in which the fuel tank 525 is fixed to the grip unit 531 can be adopted. In this case, it is possible to refill the fuel to the fuel tank 525 easily in a state in which the grip unit 531 is separated from the camera body 501. In other words, since it is possible to refill the fuel to the fuel tank 525 by just holding the grip unit 531, the refill of fuel can be done easily as compared to a case where the fuel is refilled in a state in which the grip unit 531 is fixed to the camera body 501.

According to the above described Embodiments 7 and 8, arranging the cell section in the second body that is the grip portion makes it possible to increase the arrangement space for the cell section while suppressing the increase in size of the camera, as compared to a case where the cell section is arranged in other space. Moreover, Arranging the fuel tank in the first and second bodies makes it possible to use a fuel tank with large capacity.

In Embodiments 1 to 8, the description was made about a single-lens reflex camera with a camera body and an interchangeable lens. However, the present invention can be applied to a camera equipped with a lens.

Furthermore, a fuel cell similar to the fuel cell described in Embodiments 1 to 8 can be used for electronic apparatus other than cameras, such a printer, a cellular phone, as mobile information terminal with a grip portion.

While preferred embodiments have been described, it is to be understood that modification and variation of the present invention may be made without departing from scope of the following claims.

This application claims a foreign priority based on Japanese Patent Applications Nos. 2004-073109 filed on Mar. 15, 2004, 2004-101096 filed on Mar. 30, 2004, and 2004-138085 filed on May 7, 2004 each of which is hereby incorporated by reference herein.

What is claimed is:

1. An electronic apparatus comprising:
a fuel cell comprising:
a plurality of cells, which are laminated; and
a cell box, which houses the plurality of cells,
wherein the plurality of cells include a cell whose size in a first direction orthogonal to a lamination direction of the cells is different from that of another cell, and
the cell box has a shape corresponding to the size of each cell; and
an apparatus body housing the fuel cell,
wherein at least a part of the cell box has a shape that follows the shape of the apparatus body, and
wherein the apparatus body includes a grip portion having a protruding shape or a curved shape, and at least a part of the cell box has a shape that follows the shape of the grip portion.

2. The electronic apparatus according to claim 1, wherein the electronic apparatus is a camera.
a fuel cell, which is housed in the grip portion and comprises a cell section in which a plurality of cells are laminated in a first direction,
wherein the first direction is a protrusion direction of the grip portion or a direction orthogonal to the protrusion direction.

* * * * *